United States Patent
Drolet

(10) Patent No.: US 11,248,525 B2
(45) Date of Patent: Feb. 15, 2022

(54) SYSTEM AND METHOD FOR DETECTING INLET TEMPERATURE DISTORTION OF AN ENGINE

(71) Applicant: PRATT & WHITNEY CANADA CORP., Longueuil (CA)

(72) Inventor: Martin Drolet, Saint-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 314 days.

(21) Appl. No.: 16/267,575

(22) Filed: Feb. 5, 2019

(65) Prior Publication Data
US 2020/0248623 A1     Aug. 6, 2020

(51) Int. Cl.
| | |
|---|---|
| *F02C 7/057* | (2006.01) |
| *F02C 9/20* | (2006.01) |
| *F01D 17/08* | (2006.01) |
| *F02C 9/00* | (2006.01) |

(52) U.S. Cl.
CPC .......... *F02C 7/057* (2013.01); *F01D 17/085* (2013.01); *F02C 9/20* (2013.01); *F02C 9/00* (2013.01); *F05D 2240/12* (2013.01); *F05D 2260/80* (2013.01); *F05D 2270/102* (2013.01); *F05D 2270/303* (2013.01); *F05D 2270/304* (2013.01)

(58) Field of Classification Search
CPC ...... F02C 9/00; F02C 9/16; F02C 9/20; F02C 9/22; F02C 9/30; F05D 2270/10; F05D 2270/101; F05D 2270/303; F05D 2240/12; F01D 17/085
See application file for complete search history.

(56) References Cited

U.S. PATENT DOCUMENTS

| | | | | |
|---|---|---|---|---|
| 3,867,717 A | * | 2/1975 | Moehring | F04D 27/001 340/626 |
| 3,938,319 A | | 2/1976 | Thomson | |
| 4,414,807 A | * | 11/1983 | Kerr | F02C 9/28 60/204 |
| 4,467,640 A | * | 8/1984 | Morrison | B64D 31/00 73/112.03 |
| 5,448,881 A | * | 9/1995 | Patterson | F02C 7/057 60/794 |

(Continued)

OTHER PUBLICATIONS

Kurzke, J. (Apr. 28, 2008). "Effects of Inlet Flow Distortion on the Performance of Aircraft Gas Turbines." ASME. J. Eng. Gas Turbines Power. Jul. 2008; 130(4): 041201. https://doi.org/10.1115/1.2901190. retrieved on Jan. 28, 2020 (Year: 2008).*

(Continued)

*Primary Examiner* — Alain Chau
(74) *Attorney, Agent, or Firm* — Norton Rose Fulbright Canada LLP

(57) ABSTRACT

A system and method for detecting inlet temperature distortion of an engine are described. The method comprises obtaining an outside air temperature from at least one first sensor, obtaining an inlet temperature of the engine from at least one second sensor, determining an inlet temperature distortion based on a difference between the outside air temperature and the inlet temperature, comparing the inlet temperature distortion to a threshold, and issuing an alert when the inlet temperature distortion exceeds the threshold.

20 Claims, 7 Drawing Sheets

(56) References Cited

U.S. PATENT DOCUMENTS

| | | | | |
|---|---|---|---|---|
| 7,422,414 B2* | 9/2008 | Fujii | ............... | F02C 9/20 |
| | | | | 415/1 |
| 9,194,301 B2 | 11/2015 | Parente | | |
| 9,528,913 B2* | 12/2016 | Heda | ............... | F01D 21/003 |
| 10,100,728 B2* | 10/2018 | Sander | ............... | F02C 3/34 |
| 2007/0031238 A1* | 2/2007 | Fujii | ............... | F04D 27/0246 |
| | | | | 415/48 |
| 2010/0021285 A1* | 1/2010 | Rowe | ............... | F04D 29/563 |
| | | | | 415/125 |
| 2013/0086883 A1* | 4/2013 | Sander | ............... | F02C 9/20 |
| | | | | 60/39.52 |
| 2016/0025596 A1* | 1/2016 | Heda | ............... | G01M 15/14 |
| | | | | 73/112.06 |
| 2017/0074175 A1* | 3/2017 | Uyama | ............... | F02C 3/04 |
| 2018/0156227 A1 | 6/2018 | Chapman et al. | | |

OTHER PUBLICATIONS

Kurzke, J., GasTurb 13 User Manual, p. 162-165, www.gasturb.de. retrieved on Jan. 29, 2020 (Year: 2018).*

R. Antl. "The effect of inlet temperature distortion on the performance of a turbo-fan engine compressor system," AIAA 1970-625. 6th Propulsion Joint Specialist Conference. Jun. 1970. <https://arc.aiaa.org/doi/abs/10.2514/6.1970-625> (Year: 1970).*

\* cited by examiner

SYSTEM AND METHOD FOR DETECTING INLET TEMPERATURE DISTORTION OF AN ENGINE

TECHNICAL FIELD

The present disclosure relates generally to engines, and more particularly to inflight detection of inlet temperature distortion.

BACKGROUND OF THE ART

Compressor stability margins in gas turbine engines are typically limited by inlet distortion. Inlet distortion refers to conditions of an inlet that are not uniform across the inlet, such as temperature and pressure. In order to account for this, worse case scenarios are determined prior to a flight and then used inflight to set various engine parameters, such as engine acceleration, variable guide vane position, and bleed-off valve position.

Relying on worse case scenarios limits engine performance and/or capability. Therefore, improvements are needed.

SUMMARY

In accordance with a broad aspect, there is provided a method for detecting inlet temperature distortion of an engine. The method comprises obtaining an outside air temperature from at least one first sensor, obtaining an inlet temperature of the engine from at least one second sensor, determining an inlet temperature distortion based on a difference between the outside air temperature and the inlet temperature, comparing the inlet temperature distortion to a threshold, and issuing an alert when the inlet temperature distortion exceeds the threshold.

In accordance with another broad aspect, there is provided a system for detecting inlet temperature distortion of an engine. The system comprises a processing unit and a memory having stored thereon program code. The program code is executable by the processing unit for obtaining an outside air temperature from at least one first sensor, obtaining an inlet temperature of the engine from at least one second sensor, determining an inlet temperature distortion based on a difference between the outside air temperature and the inlet temperature, comparing the inlet temperature distortion to a threshold, and issuing an alert when the inlet temperature distortion exceeds the threshold.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
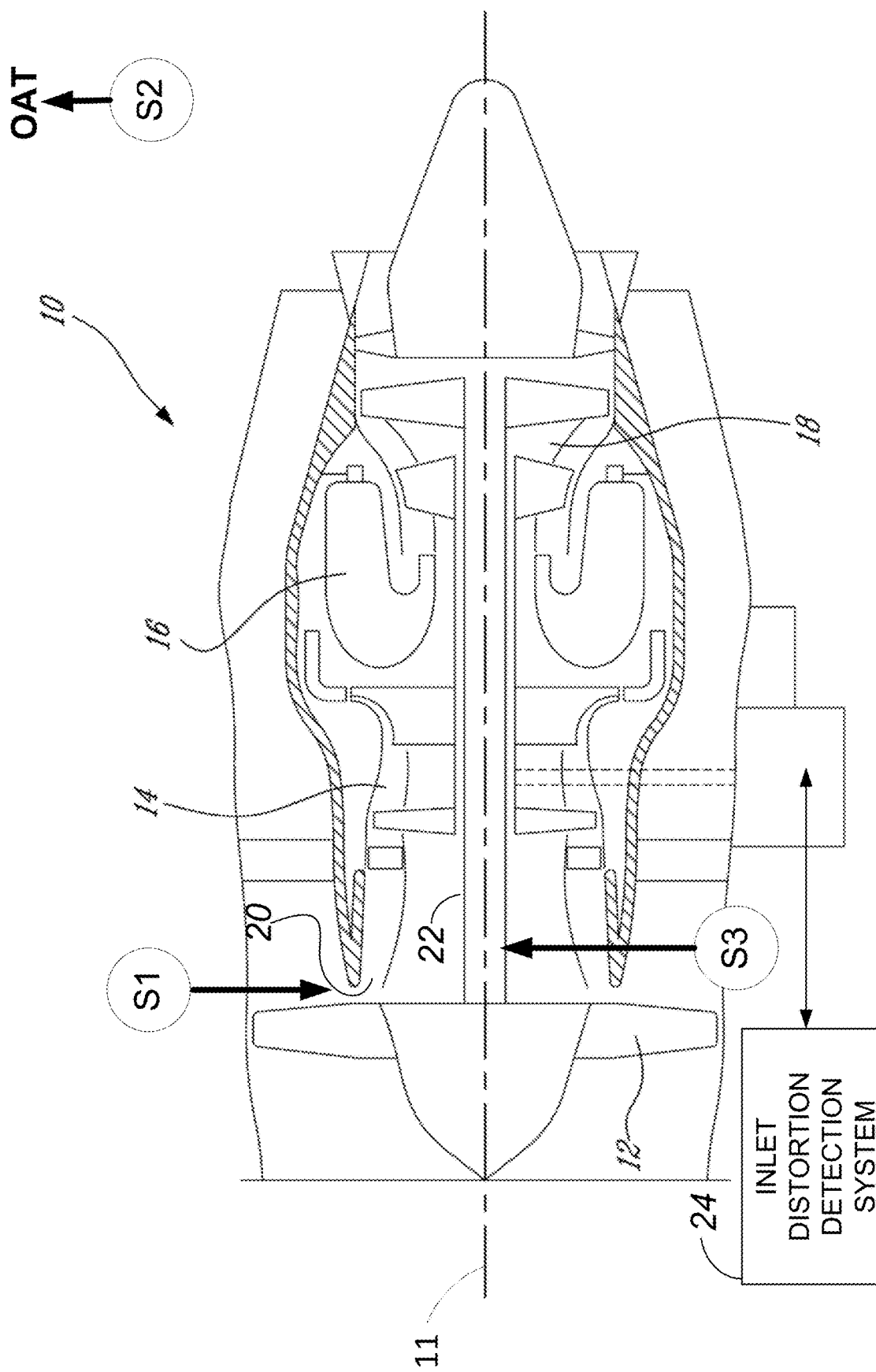
FIG. 1 is a schematic cross-sectional view of an example gas turbine engine.

FIG. 1 illustrates an example engine 10 for which inlet temperature distortion may be detected using the methods and systems described herein. Note that while engine 10 is a turbofan engine, the inlet temperature distortion detecting methods and systems may be applicable to turboprop, turboshaft, and other types of gas turbine engines. The methods and system may also be applied to other types of engines, such as turbo-compounded engines and hybrid-electric engines. The engine may be part of an aircraft or other industrial application.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

At least one sensor S1 is positioned adjacent to an inlet 20 of the engine 10, for measuring the inlet temperature, also referred to as T1. At least one sensor S2 is positioned outside of the engine 10, for measuring the outside air temperature (OAT). For example, if the engine 10 is part of an aircraft, then sensor S2 measures the air outside of the aircraft. Sensors S1, S2 may be any type of temperature sensor, such as but not limited to a thermistor, a resistance thermometer, a thermocouple, and a semiconductor-based temperature sensor.

In some embodiments, at least one sensor S3 is provided to measure a rotational speed of the engine 10, for example by measuring the speed of a shaft 22 of the engine 10. Any type of speed sensor may be used, such as but not limited to a tachometer, a strobe light, a hall effect speed sensor, a variable reluctance speed sensor, and an RF (eddy current) speed sensor. The sensor S3 may be a contact or a non-contact type of sensor, and may be positioned to measure the rotational speed of another component of the engine 10 also representative of engine rotational speed, such as the fan 12.

An inlet distortion detection system 24 is operatively coupled to the engine 10. In some embodiments, the system 24 is coupled to the engine 10 via wired communication means, for example electrical or optical cables. In other embodiments, the communication means are wireless communication means, for example Bluetooth™, Zigbee™, or the like. Combinations of wired and wireless communication means are also considered. The system 24 may be coupled to sensors S1, S2, and/or S3 for receiving temperature and speed measurements. The system 24 may also be coupled to other sensors for measuring other parameters, such as pressure.

The system 24 may be implemented as part of a FADEC or other similar device, including electronic engine control (EEC), engine control unit (EUC), engine electronic control system (EECS), and the like. Alternatively, the system 24 is a separate computing device that is configured for communicating with any one of a FADEC, an EEC, an EUC, an EECS, and the like.

Figure 2A:
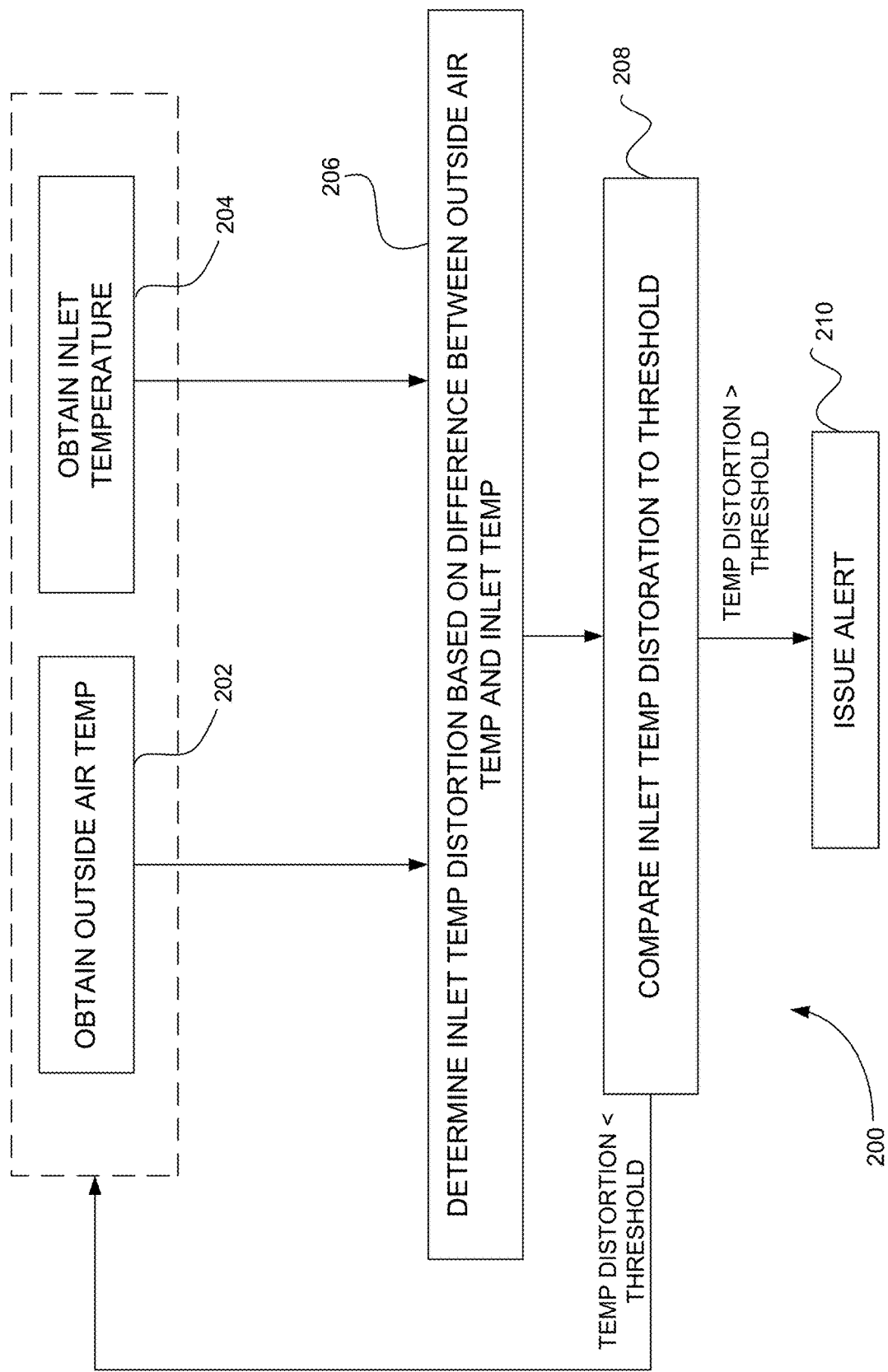
FIGS. 2A-2B are flowcharts of example methods for detecting inlet temperature distortion.

The inlet distortion detection system 24 is configured for detecting inlet temperature distortion of an engine, such as engine 10. An example method 200 as performed by the system 24 is illustrated in FIG. 2A. At step 202, an outside air temperature is obtained, for example using the sensor S2, as illustrated in FIG. 1. At step 204, an inlet temperature of the engine is obtained, for example using the sensor S1 as illustrated in FIG. 1. Steps 202 and 204 are performed inflight, as the engine is in operation. Steps 202, 204 may be performed concurrently, as illustrated, or sequentially, for example step 202 followed by step 204, or step 204 followed by step 202. The measurements may be obtained upon request, at a regular interval, at an irregular interval, or upon any other trigger.

At step 206, the inlet temperature distortion is determined based on a difference between the outside air temperature (OAT) and the inlet temperature (T1). The difference is found using (T1-OAT) or (OAT-T1). In some embodiments, the absolute value of the difference is used. The difference is then used to find the inlet temperature distortion using a relationship between the difference and the inlet temperature distortion.

In some embodiments, the relationship between the inlet temperature distortion and the temperature difference is found through simulations and/or testing. For example, in a testing environment, a plurality of differences in temperature are applied between an inlet and the outside air of an engine. The temperature distortion across the inlet may be determined by measuring the inlet temperature at multiple points across the inlet and calculating temperature distortion (in %) based on the measurements. An example is shown in Table 1.

TABLE 1

| Difference between T1 and OAT (° C.) | Inlet Temperature Distortion (° C.) |
| --- | --- |
| 5.0 | 6.0 |
| 6.0 | 8.0 |
| 7.0 | 10.0 |

The values shown in Table 1 are illustrative only. In the example, a difference in temperature of 5.0° C. is found to result in an inlet temperature distortion of 6.0° C., a difference in temperature of 6.0° C. is found to result in an inlet temperature distortion of 8.0° C., and a difference in temperature of 7.0° C. is found to result in an inlet temperature distortion of 10.0° C. Therefore, if the difference between T1 and OAT is found to be 6.0°, then the inlet distortion is determined to be 8.0° C. More than three values may be used in actual implementations.

Figure 3:
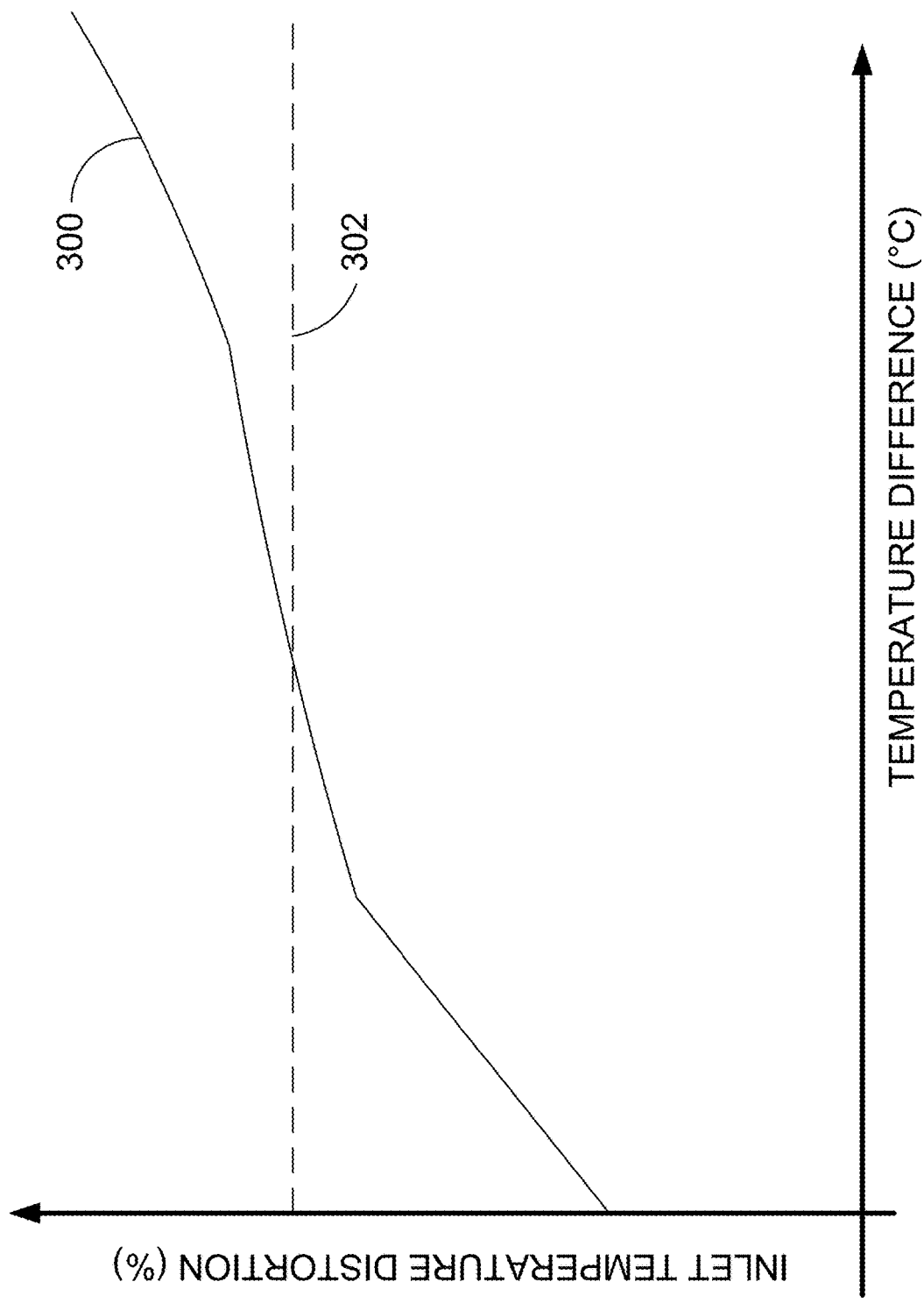
FIG. 3 is a graph illustrating an example relationship between inlet temperature distortion and a temperature difference between OAT and T1.

Pre-determined values may be recorded in various formats, such as a lookup table. FIG. 3 illustrates an example of another format for recording pre-determined pairs of values for temperature difference and the inlet temperature distortion, namely a graph format. In this example, each value of temperature difference is associated with a corresponding value of inlet temperature distortion along curve 300. In some embodiments, a finite number of values are obtained, via testing and/or simulating, and these values are interpolated to generate curve 300. In some embodiments, the entire curve 300 is obtained via simulation. Simulation refers to computer modeling of engine behavior, using fluid dynamics and other mathematical and physical principles.

In some embodiments, step 206 comprises determining the difference in temperature between T1 and OAT and retrieving a pre-stored inlet temperature distortion associated with the difference in temperature as determined. Using the example of Table 1, retrieving the inlet temperature distortion comprises finding the difference in temperature in the table and retrieving the associated inlet temperature distortion. Using the example of FIG. 3, retrieving the inlet temperature distortion comprises finding the difference in temperature on the curve 300 and determining the corresponding value on the graph for the inlet temperature distortion. Other implementations of using pre-stored pairs of values for temperature difference and inlet temperature distortion are also considered.

In some embodiments, an algorithm or formula relating inlet temperature distortion and temperature difference is applied in real time or substantially real time. For example, an equation for the curve 300 of FIG. 3 is extrapolated using a plurality of measured and/or simulated values and pre-stored in a storage medium. When a difference in temperature is determined inflight, the inlet distortion detection system 24 applies the pre-stored equation and determines in real time the corresponding inlet temperature distortion. Any algorithm or formula previously found to relate the temperature difference to the inlet temperature distortion may be applied in real time inflight.

Referring back to FIG. 2A, once the inlet temperature distortion has been found, it is compared to a threshold at step 208. An example threshold 302 is illustrated in FIG. 3 with respect to curve 300. The threshold 302 defines values below which an inlet temperature distortion does not trigger a response and values above which an inlet temperature distortion triggers a response. At step 210, an alert is issued when the inlet temperature distortion exceeds the threshold. When the inlet temperature distortion is below the threshold, the method 200 returns to the steps of obtaining the various temperature measurements, namely the OAT at step 202 and the inlet temperature at step 204.

In some embodiments, issuing the alert comprises issuing a visual and/or audible alert to the cockpit of the aircraft. Such an alert provides awareness to the pilot, who can use the information and react accordingly. For example, the pilot may change the rotorcraft azimuth and/or altitude in response to the inlet temperature distortion. Alternatively or in combination therewith, awareness on the part of the pilot may cause him or her to maneuver with more care.

An audible alert may consist in a chime, ring, buzzer, or other suitable sound, and different sounds can be associated with different results of the comparison at step 208. For example, the amount by which the inlet temperature distortion exceeds the threshold may also be quantified and associated with a different alert level. The sound may be louder as the threshold is more exceeded, or a different type of sound may be used as a function of the alert level. Alternatively, or in addition, the visible alert may consist in a coloured light, a particular flashing pattern, a dialog box on a screen of a cockpit computer, or any other suitable visual marker, and different visual markers can be associated with different results of the comparison at step 208. Other approaches are also considered.

Figure 2B:
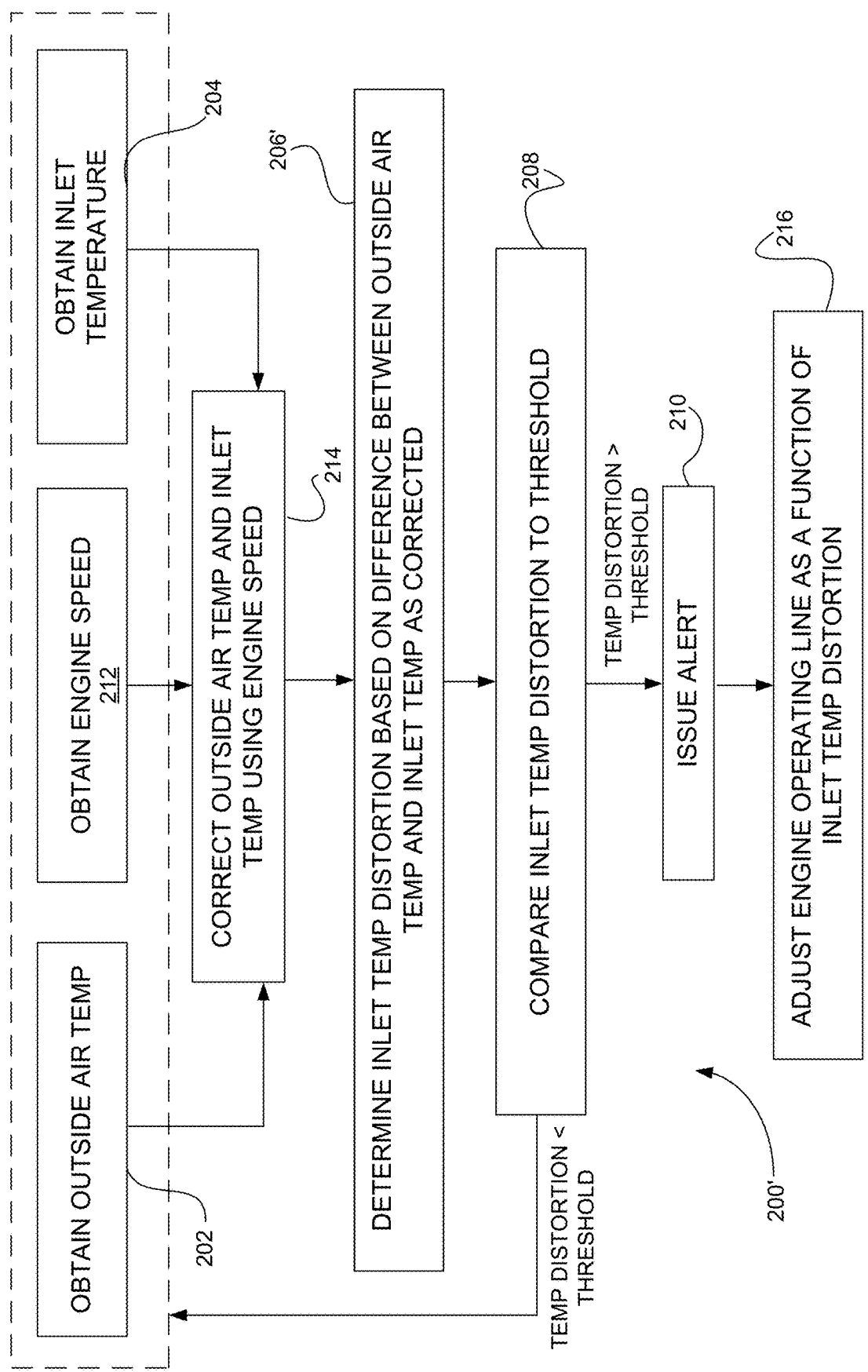

Referring to FIG. 2B, there is illustrated another embodiment of a method 200' for detecting inlet temperature distortion of an engine. In addition to the OAT and inlet temperature measurements obtained at steps 202 and 204, the method 200' comprises obtaining an engine speed at step 212. Step 212 may be performed concurrently with steps 202, 204, as illustrated. Alternatively, step 212 may be performed sequentially with steps 202, 204, such as before steps 202, 204 or after steps 202, 204. Steps 202, 204, and 212 may be performed in any desired order.

In some embodiments, the engine speed is obtained using one or more speed sensors, such as sensor S3. In some embodiments, the engine speed is obtained by querying one or more computing devices of an aircraft, such as an engine computer or an aircraft computer. Other implementations are also considered.

At step 214, the temperature measurements obtained at steps 202, 204 are corrected as a function of the engine speed, for example by correcting for Mach number, altitude, and/or measurement error/accuracy. Such corrections account for total vs static temperature measurement, and for measurement inaccuracies that can occur at high altitudes and/or at high air speeds. In some embodiments, Mach number is obtained using another parameter, such as total and static pressures. These values may be measured dynamically inflight or they may be obtained from one or more other component of the aircraft.

At step 206', the inlet temperature distortion is determined based on the difference between the outside air temperature and the inlet temperature as corrected, using any of the methods described above.

Steps 208 and 210 are identical to that presented for method 200. In some embodiments, step 210 of issuing an alert comprises issuing an alert to an engine control system, such as an electronic engine control (EEC), a full authority digital engine control (FADEC), an engine control unit (ECU), or the like. In response, the engine control system may cause an adjustment to an engine operating line, as per step 216. Indeed, once the inlet temperature distortion has been quantified inflight, various engine parameters may be set accordingly.

Figure 4A:
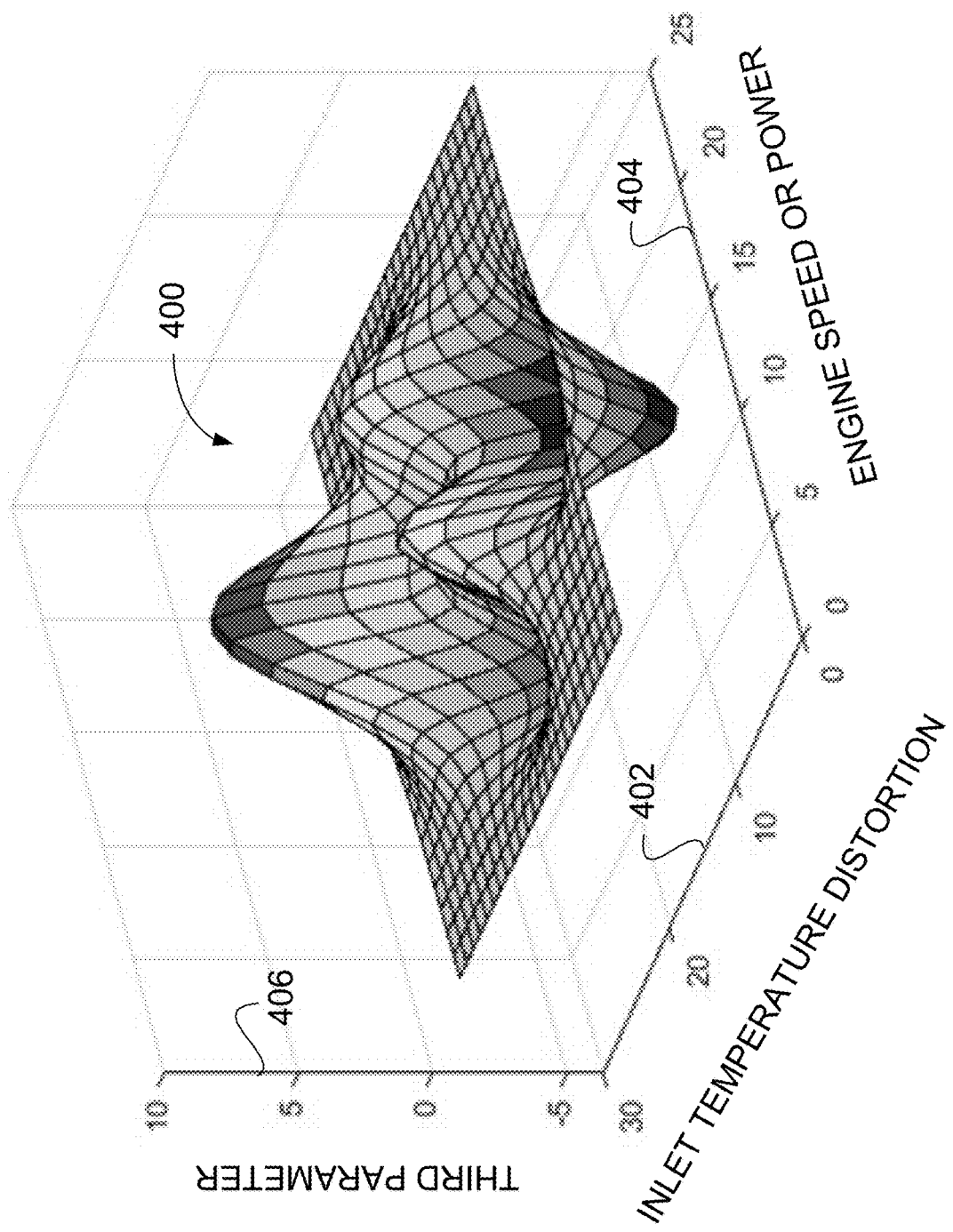
FIGS. 4A-4B are graphs illustrating an example relationship between three engine parameters for adjusting an engine operating line.

Referring to FIG. 4A, there is illustrated an example graph 400 demonstrating how the inlet distortion detection system 24 uses the inlet temperature distortion to adjust the engine operating line. Graph 400 represents three interrelated engine parameters. A first engine parameter is found along axis 402 and represents the inlet temperature distortion. A second engine parameter is found along axis 404 and represents engine speed or power. The second parameter may also be represented by an equivalent to engine speed or power, such as engine torque. A third engine parameter is found along axis 406. The third engine parameter may be any engine parameter typically managed inflight as a function of engine speed or power (or an equivalent), such as but not limited to engine acceleration, variable guide vane position, bleed-off valve position, inter-turbine temperature limitations and active tip clearance control. In accordance with the embodiments described herein, the system 24 may be configured to optimize engine performance and/or operability characteristics of the third parameter in real time using the inlet temperature distortion. When setting the third parameter, the system 24 considers the first and second parameters, namely inlet temperature distortion as determined using methods 200, 200' and engine speed or power (or an equivalent) and determines the third parameter using, for example the graph 400 of FIG. 4A.

Figure 4B:
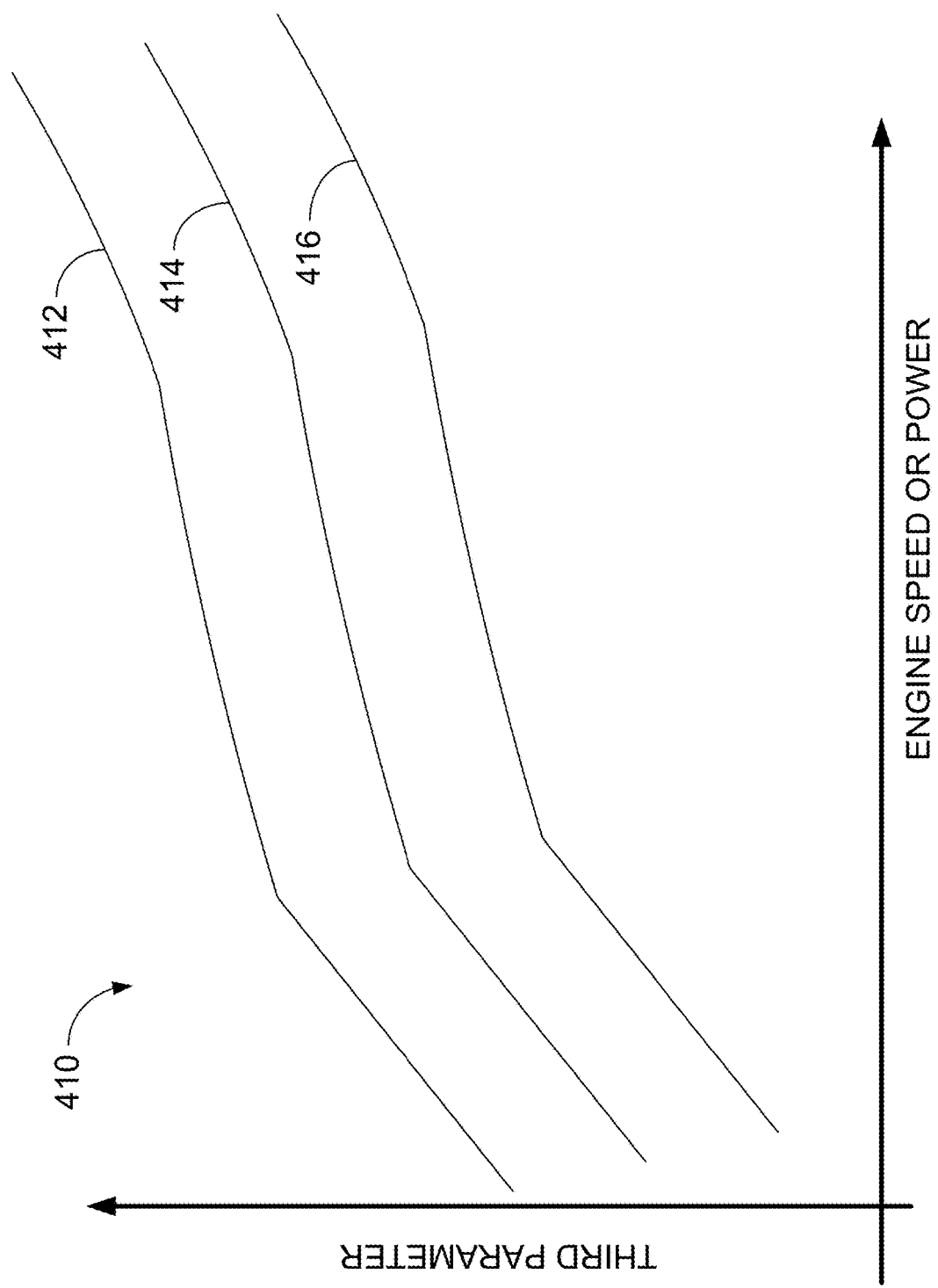

Referring to FIG. 4B, there is illustrated another graph 410 that may be used to set the third parameter. In this case, multiple curves 412, 414, 416 are provided relating the third parameter to engine speed or power, each curve representing a different inlet temperature distortion. For example, curve 412 may be used when the inlet temperature distortion is 4° C., curve 414 may be used when the inlet temperature distortion is 5° C., and curve 416 may be used when the inlet temperature distortion is 6° C. Using the methods described herein, the system 24 may be configured to determine the inlet temperature distortion inflight as a function of the OAT and T1 measurements, and to adjust the engine operating line in response when the inlet temperature distortion is found to be above a given threshold.

Figure 5:
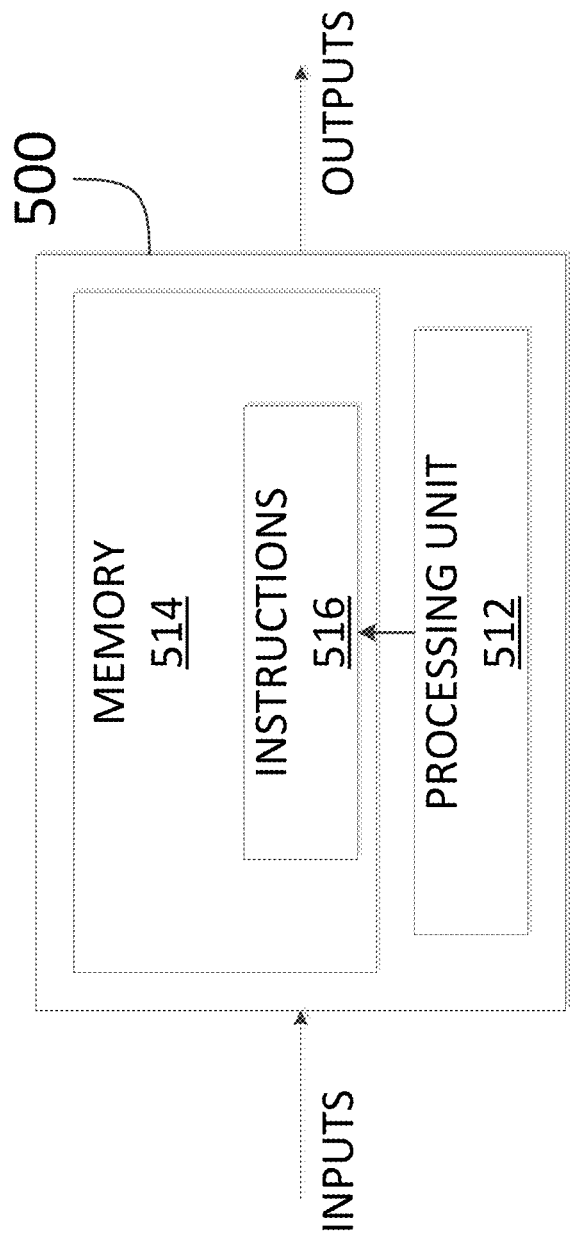
FIG. 5 is block diagram of an example computing device for detecting inlet temperature distortion.

With reference to FIG. 5, the methods 200, 200' of FIGS. 2A, 2B may be implemented by a computing device 510 as an embodiment of the inlet distortion detection system 24. The computing device 510 comprises a processing unit 512 and a memory 514 which has stored therein computer-executable instructions 516. The processing unit 512 may comprise any suitable devices configured to implement the functionality of the system 24 such that instructions 516, when executed by the computing device 510 or other programmable apparatus, may cause the functions/acts/steps performed by the system 24 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The methods and systems for detecting inlet temperature distortion of an engine as described herein may be implemented in a high level procedural or object oriented programming or scripting language, or a combination thereof, to communicate with or assist in the operation of a computer system, for example the computing device 500. Alternatively, the methods and systems for detecting inlet temperature distortion may be implemented in assembly or machine language. The language may be a compiled or interpreted language.

Embodiments of the methods and systems for detecting inlet distortion may also be considered to be implemented by way of a non-transitory computer-readable storage medium having a computer program stored thereon. The computer program may comprise computer-readable instructions which cause a computer, or more specifically the processing unit 512 of the computing device 500, to operate in a specific and predefined manner to perform the functions described herein, for example those described in the methods 200, 200'.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting inlet temperature distortion of an engine of an aircraft, the method comprising operating a controller configured for:
   obtaining an outside air temperature outside of the aircraft from at least one first sensor;
   obtaining an inlet temperature of the engine from at least one second sensor;
   determining an inlet temperature distortion based on a relationship between the inlet temperature distortion and a difference between the outside air temperature and the inlet temperature;
   comparing the inlet temperature distortion to a threshold; and
   issuing an alert when the inlet temperature distortion exceeds the threshold, the alert indicative of the inlet temperature distortion having reached a level affecting an operating line of the engine.

2. The method of claim 1, wherein issuing the alert comprises issuing the alert to a cockpit of the aircraft.

3. The method of claim 1, wherein issuing the alert comprises issuing the alert to an engine control system of the aircraft.

4. The method of claim 3, further comprising adjusting the engine operating line in response to receiving the alert as a function of the inlet temperature distortion.

5. The method of claim 4, wherein adjusting the engine operating line comprises setting the engine operating line as a function of a first parameter corresponding to the inlet temperature distortion, a second parameter corresponding to any one of speed, power, and torque of the engine, and a third parameter.

6. The method of claim 5, wherein the third parameter corresponds to any one of acceleration, variable guide vane position, bleed-off valve position, and active tip clearance control.

7. The method of claim 5, wherein setting the engine operating line comprises using a pre-stored map of the first parameter vs the second parameter vs the third parameter.

8. The method of claim 1, wherein the controller is further configured for:
   obtaining a speed of the engine; and
   correcting the outside air temperature and the inlet temperature as a function of the speed of the engine.

9. The method of claim 1, wherein determining the inlet temperature distortion comprises using a pre-stored correlation between the inlet temperature distortion and the difference between the outside air temperature and the inlet temperature.

10. The method of claim 1, wherein determining the inlet temperature distortion comprises calculating the inlet temperature distortion inflight using the difference between the outside air temperature and the inlet temperature and a pre-stored equation relating inlet temperature distortion to the difference.

11. A system for detecting inlet temperature distortion of an engine of an aircraft, the system comprising:
    a processing unit; and
    a memory having stored thereon program code executable by the processing unit for:
       obtaining an outside air temperature outside of the aircraft from at least one first sensor;
       obtaining an inlet temperature of the engine from at least one second sensor;
       determining an inlet temperature distortion based on a relationship between the inlet temperature distortion and a difference between the outside air temperature and the inlet temperature;
       comparing the inlet temperature distortion to a threshold; and
       issuing an alert when the inlet temperature distortion exceeds the threshold, the alert indicative of the inlet temperature distortion having reached a level affecting an operating line of the engine.

12. The system of claim 11, wherein issuing the alert comprises issuing the alert to a cockpit of the aircraft.

13. The system of claim 11, wherein issuing the alert comprises issuing the alert to an engine control system of the aircraft.

14. The system of claim 13, wherein the program code is further executable for adjusting the engine operating line in response to receiving the alert as a function of the inlet temperature distortion.

15. The system of claim 14, wherein adjusting the engine operating line comprises setting the engine operating line as a function of a first parameter corresponding to the inlet temperature distortion, a second parameter corresponding to any one of speed, power, and torque of the engine, and a third parameter.

16. The system of claim 15, wherein the third parameter corresponds to any one of acceleration, variable guide vane position, bleed-off valve position, and active tip clearance control.

17. The system of claim 15, wherein setting the engine operating line comprises using a pre-stored map of the first parameter vs the second parameter vs the third parameter.

18. The system of claim 11, wherein the program code is further executable for:
    obtaining a speed of the engine; and
    correcting the outside air temperature and the inlet temperature as a function of the speed of the engine.

19. The system of claim 11, wherein determining the inlet temperature distortion comprises using a pre-stored correlation between the inlet temperature distortion and the difference between the outside air temperature and the inlet temperature.

20. The system of claim 11, wherein determining the inlet temperature distortion comprises calculating the inlet temperature distortion inflight using the difference between the outside air temperature and the inlet temperature and a pre-stored equation relating inlet temperature distortion to the difference.

* * * * *